(12) United States Patent
Lopatinsky et al.

(10) Patent No.: US 6,695,038 B2
(45) Date of Patent: Feb. 24, 2004

(54) HEAT EXCHANGER TYPE FAN

(75) Inventors: Edward Lopatinsky, San Diego, CA (US); Lev A. Fedoseyev, Chula Vista, CA (US); Yuriy Igorevich Fedosov, Sankt-Peterburg (RU); Oleg Mikhailovich Gerasimov, Sankt-Peterburg (RU); Victor Nikitovich Popov, Sankt-Peterburg (RU)

(73) Assignee: Advanced Rotary Systems, LLC, San Diego, CA (US)

( * ) Notice: Subject to any disclaimer, the term of this patent is extended or adjusted under 35 U.S.C. 154(b) by 0 days.

(21) Appl. No.: 10/195,576

(22) Filed: Jul. 15, 2002

(65) Prior Publication Data

US 2003/0034151 A1 Feb. 20, 2003

Related U.S. Application Data

(63) Continuation of application No. 09/830,844, filed as application No. PCT/US00/23900 on Aug. 31, 2000, now abandoned.

(30) Foreign Application Priority Data

Sep. 2, 1999 (RU) ............................ 99119121
Sep. 2, 1999 (RU) ............................ 99119164

(51) Int. Cl.[7] ................................. F28D 11/02
(52) U.S. Cl. ..................... 165/88; 165/164; 416/184
(58) Field of Search ................. 165/88, 164; 416/175, 416/183, 184, 203; 415/98, 101, 102

(56) References Cited

U.S. PATENT DOCUMENTS

| | | | | |
|---|---|---|---|---|
| 1,448 A | * | 12/1839 | Dimpfel | 415/195 |
| 40,982 A | * | 12/1863 | Nobles | 415/206 |
| 850,609 A | * | 4/1907 | Wakefield | 416/183 |
| 912,362 A | * | 2/1909 | Capell | 416/183 |
| 1,150,278 A | * | 8/1915 | Lepley | 416/183 |
| 2,402,307 A | * | 6/1946 | Vannerus | 165/121 |
| 2,753,808 A | * | 7/1956 | Kluge | 416/183 |
| 2,767,906 A | * | 10/1956 | Doyle | 416/186 R |
| 3,394,876 A | * | 7/1968 | Eck | 415/206 |
| 3,788,765 A | * | 1/1974 | Rusak | 415/227 |
| 4,102,597 A | | 7/1978 | Itayama | |
| 4,253,798 A | * | 3/1981 | Sugiura | 415/98 |
| 4,431,048 A | * | 2/1984 | Mori et al. | 165/88 |
| 4,666,373 A | * | 5/1987 | Sugiura | 416/185 |
| 5,026,251 A | * | 6/1991 | Kinoshita et al. | 415/119 |

FOREIGN PATENT DOCUMENTS

| | | | | |
|---|---|---|---|---|
| JP | 57-67788 A | * | 4/1982 | F28D/11/02 |
| JP | 58-179795 A | * | 10/1983 | F28D/11/02 |

* cited by examiner

Primary Examiner—Allen Flanigan
(74) Attorney, Agent, or Firm—Frishauf, Holtz, Goodman & Chick, P.C.

(57) ABSTRACT

Heat exchange devices are provided for use in ventilation and air conditioning systems where the heat carriers do not mix with one another. According to one embodiment, a heat exchanger type fan includes a casing having two inlets and two outlets, and a double-sided centrifugal impeller. The casing is divided into two isolated chambers, and the chambers together with the impeller form two isolated centrifugal fans. The impeller is made of a solid dividing disk, with backward curved blades located on both sides of the dividing disk, and intermediate blades placed between the backward curved blades and located over a periphery of the dividing disk. A ratio of a length of the backward curved blades to a distance between the intermediate blades over a mid-radius of the impeller is at least 10.

4 Claims, 9 Drawing Sheets

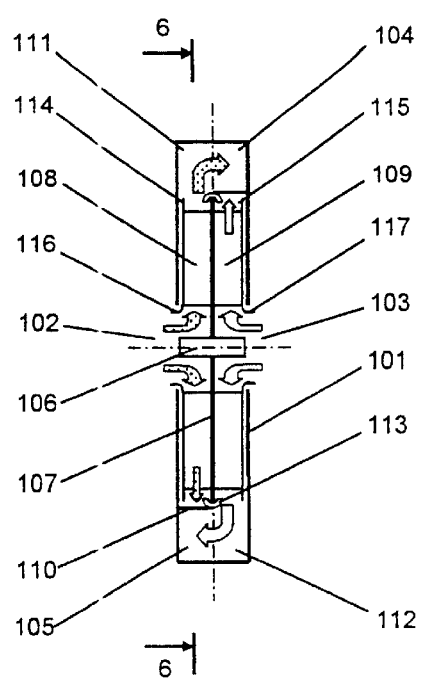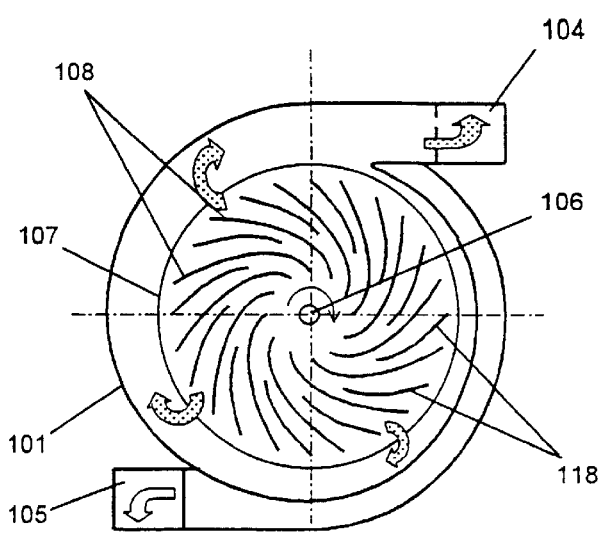
Fig. 5                    Fig. 6

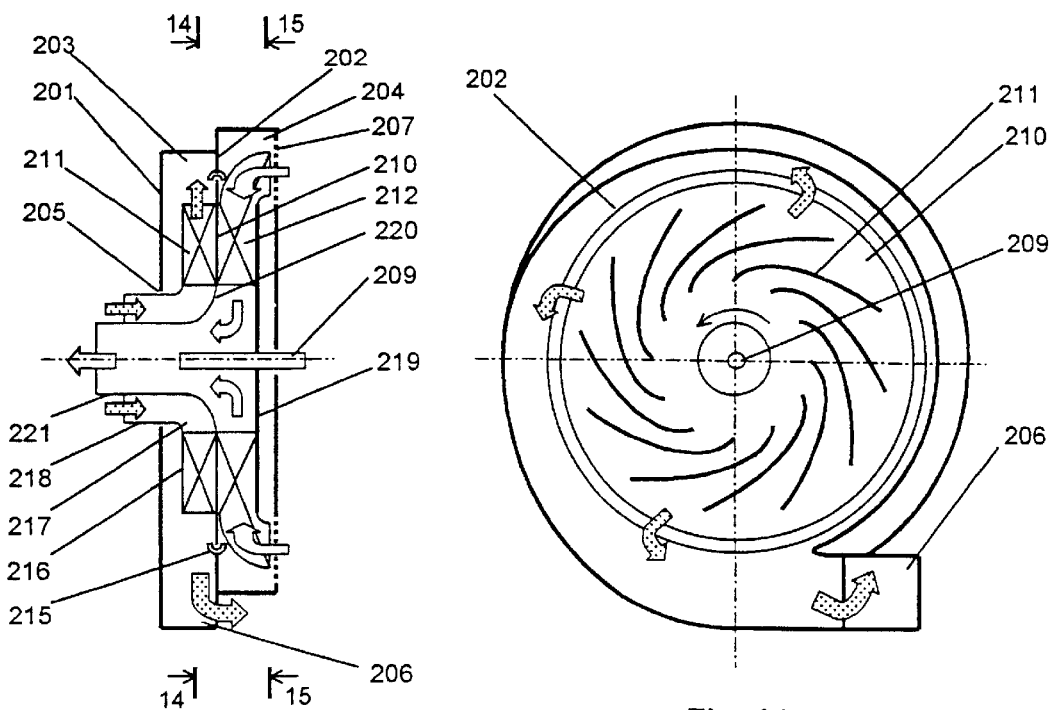
Fig. 13
Fig. 14
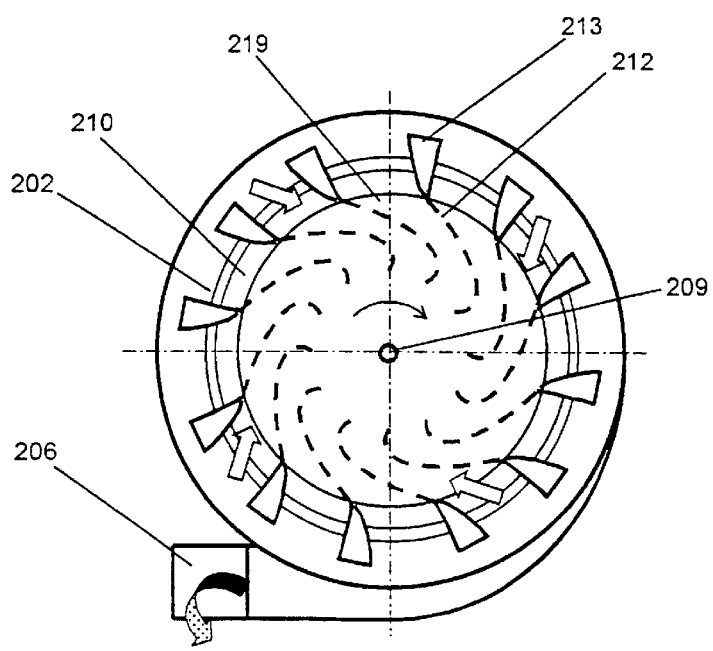
Fig. 15

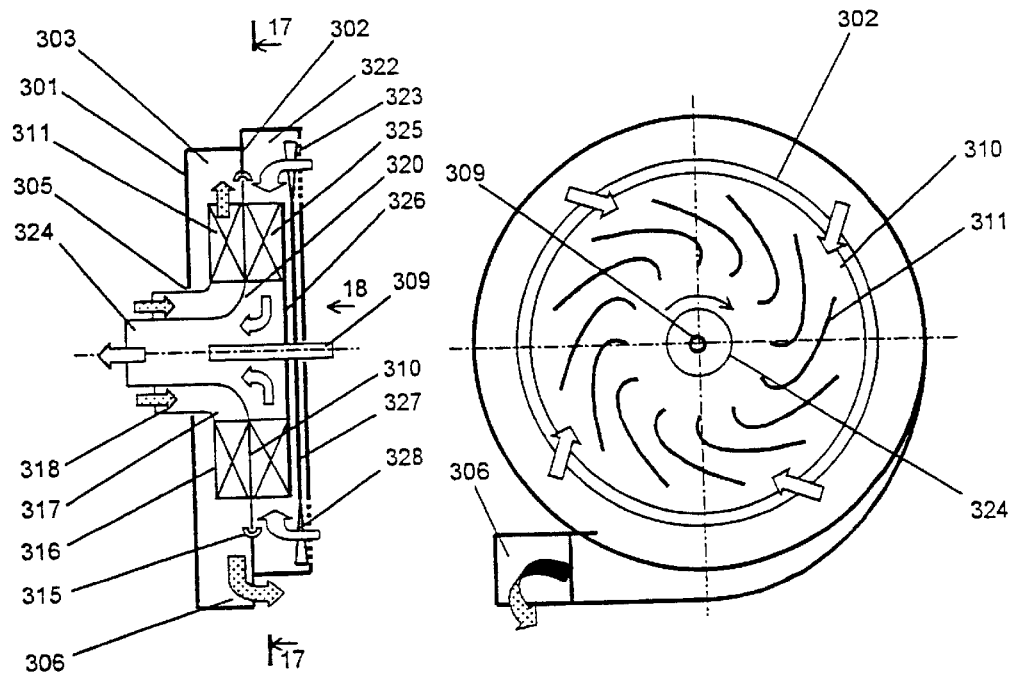
Fig. 16
Fig. 17
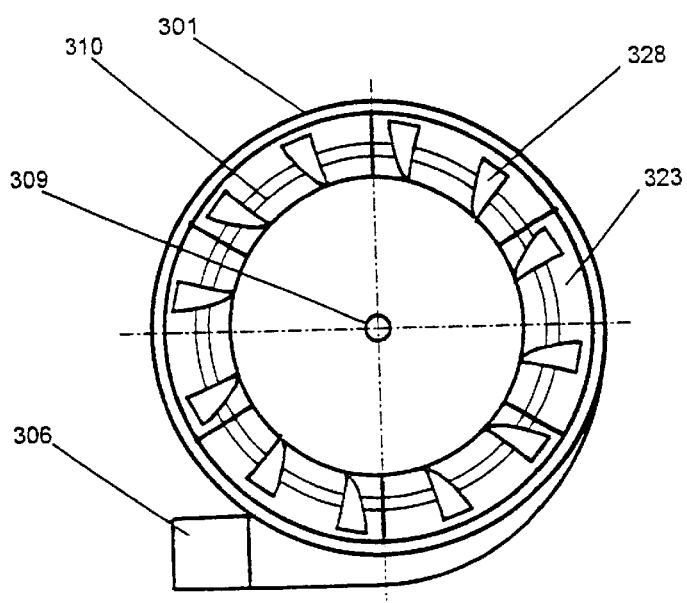
Fig. 18

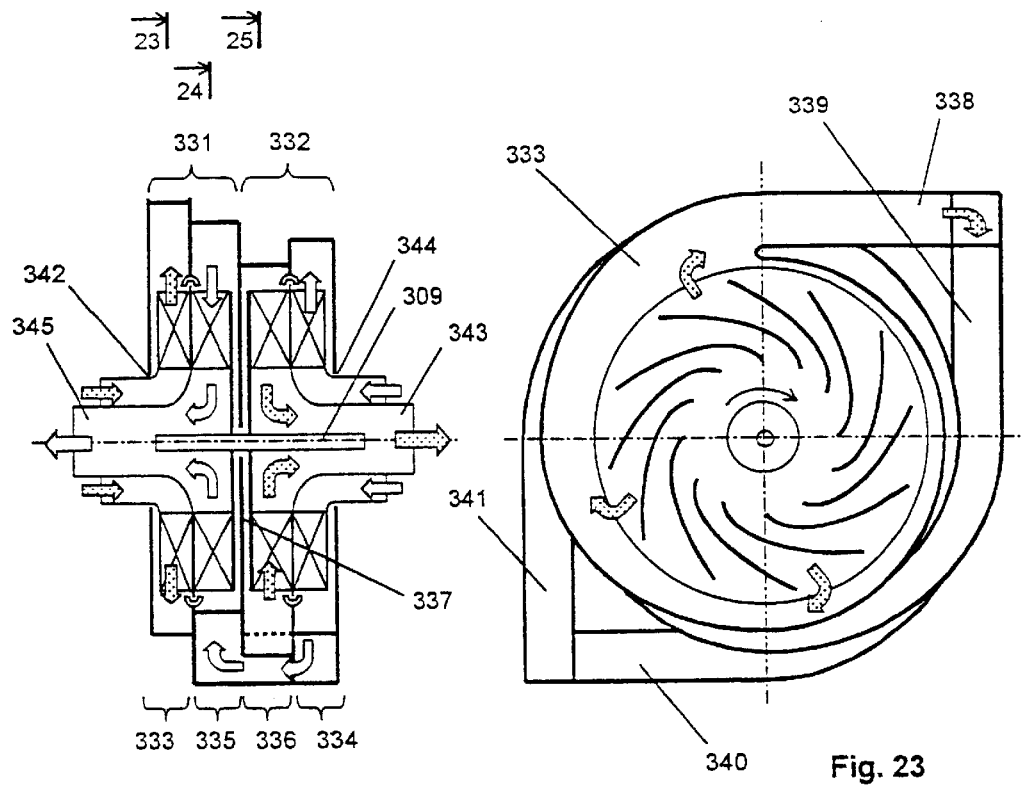
Fig. 22
Fig. 23
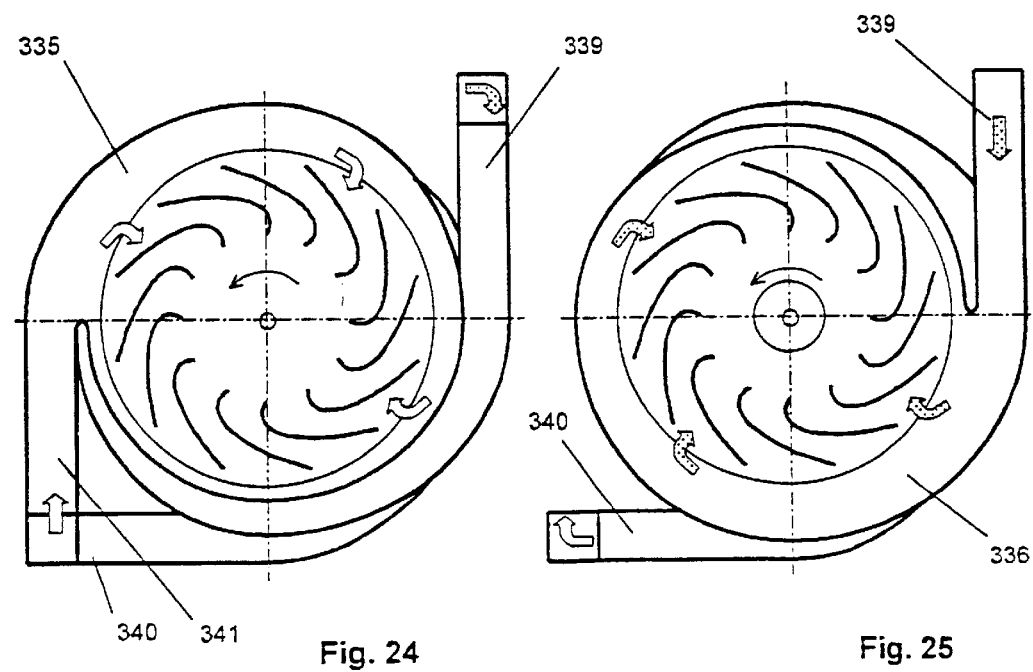
Fig. 24
Fig. 25

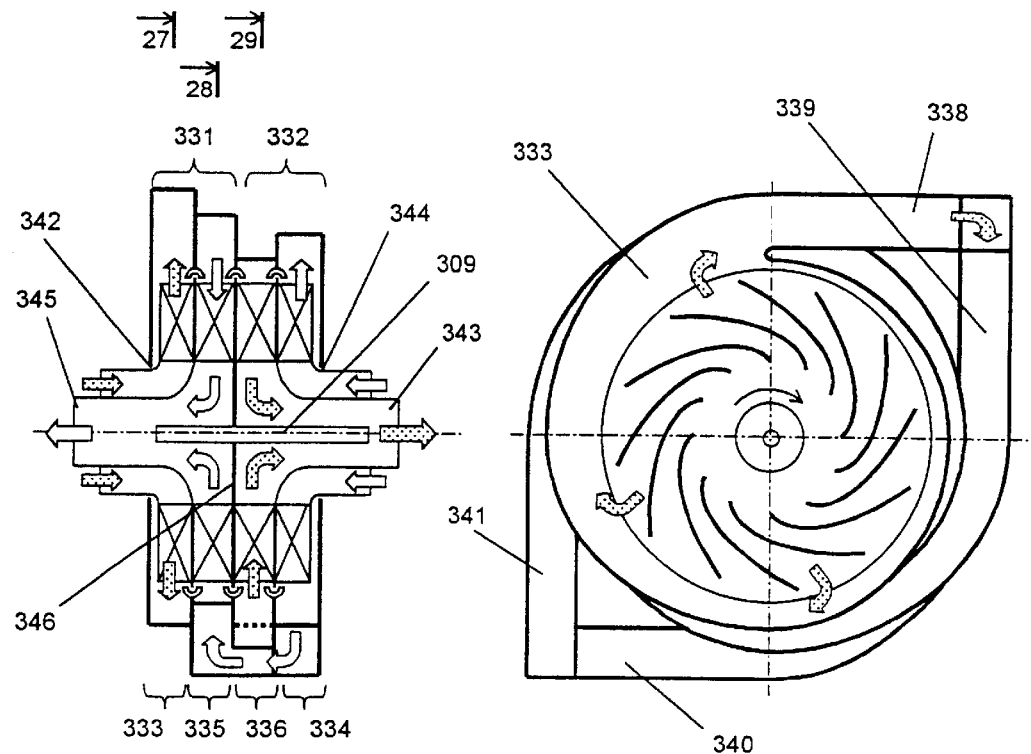
Fig. 26
Fig. 27
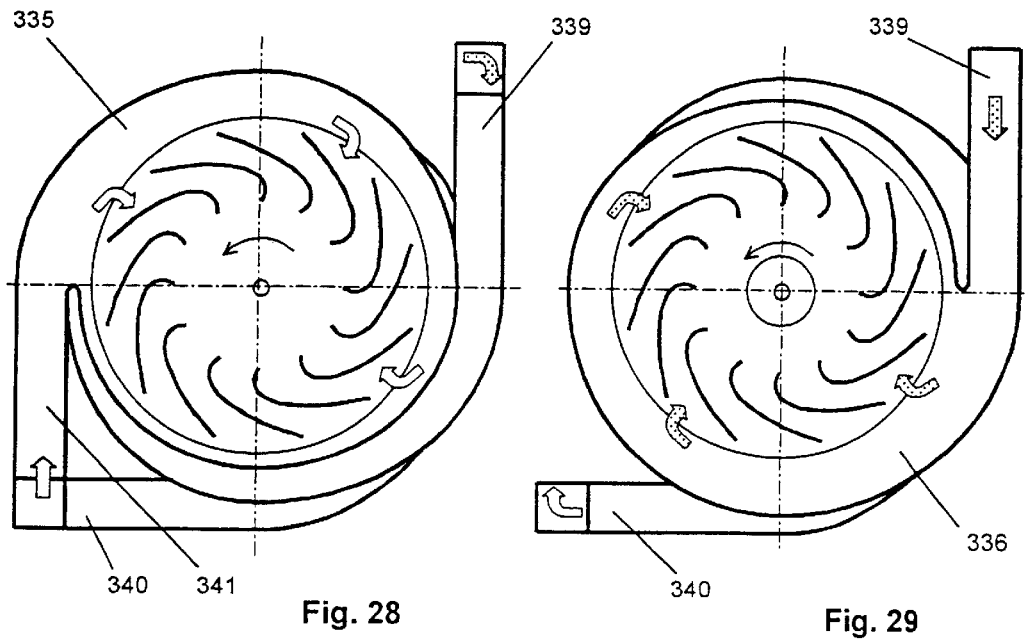
Fig. 28
Fig. 29

HEAT EXCHANGER TYPE FAN

This is a continuation of application Ser. No. 09/830,844 filed May 1, 2001 ABN which is the U.S. National Phase Application of PCT/US00/23900 filed Aug. 31, 2000.

FIELD OF THE INVENTION

The claimed invention belongs to heat exchange devices where the heat carriers do not mix, and may be used, for instance, in ventilation and air conditioning systems for heat exchange between the intake and the exhaust air streams.

BACKGROUND OF THE INVENTION

A heat exchanger type fan is known, described in a Japanese application 60-75634, (Int. Cl. F 28 D 9/00, Filed Oct. 4, 1985, Publ. Date Jun. 7, 1994), consisting of a casing and two centrifugal fans mounted on the same shaft inside the casing but oriented in opposite directions in regard to each other. Two channels for heat carriers (air streams) of different temperature are formed in the casing, separated by a heat exchange element made as a corrugated radial partition installed beyond the edges of the impellers of the fans and equipped with a disk to separate the fans. When the fans rotate, the heat carriers enter the space between the blades of the fans and further on, passing over the corrugated radial partition of the heat exchange element on both sides, are removed from the casing via the respective blower outlets. Heat exchange takes place through the corrugated partition while the heat carriers pass over its faces. A big radial size should be listed among the disadvantages of such arrangement.

A heat exchanger type fan is known, described in a Japanese application 60-75635 (Int. Cl. F 28 D 9/00, Filed Oct. 4, 1985, Publ. date Jun. 7, 1994), consisting of a casing and two centrifugal fans mounted on the same shaft inside the casing, but oriented in opposite directions in regard to each other. Two channels for heat carriers of different temperature are formed in the casing, separated by a partition separating also both fans. The heat exchange element is made as radial fins mounted on both surfaces of the partition beyond the edges of the impellers of the fans. When the fans rotate, the heat carriers enter the interblade space of the fans via the suction inlets and further on, passing over both sides of the radial fins of the heat exchange element, are removed from the casing via the respective blower outlets. Heat exchange takes place through the radial fins and the partition itself Again a big radial size should be listed among the disadvantages of such arrangement.

The closest to the claimed invention is the heat exchanger type fan described in the Japanese application 61-86463 (Int. Cl. F 28 D 11/02, Filed Apr. 15, 1986, Publ. date Jan. 6, 1994), consisting of a casing and an impeller of a double-sided centrifugal fan made as a radially corrugated disk with an outer rim, the faces of the corrugation performing the function of radial blades. There is a partition in the casing adjoining the outer rim of the impeller and dividing the casing into two isolated chambers (channels) for heat carriers (air streams) of different temperature. Owing to this partition, there are two isolated centrifugal fans formed inside the casing with a single double-sided impeller. When the impeller rotates, the heat carriers enter the interblade space of the fans via the respective suction inlets and further on are removed from the casing via the respective blower outlets. Under such arrangement heat exchange takes place through the radial faces of the corrugated impeller.

In the known heat exchanger type fan the impeller, being the heat exchange surface at the same time, is formed by a radially corrugated surface. Such impeller design results in its low efficiency both as a part of a centrifugal fan and as a heat exchanger.

The former is explained by the fact that it is the radially corrugated surface that performs the function of the blades. In this case the air stream outgoing from the impeller of the fan has a surplus pressure exceeding that necessary pressure to overcome the total hydraulic resistance of the fan. This will require more power to be supplied. To eliminate this feature, characteristic of centrifugal fans with radial blades, blades of a different shape are required, namely backward-curved blades. It is obvious that manufacturing a corrugated disk with bent blades presents a rather difficult engineering problem. The curvature of such corrugation will be determined by the permissible plastic deformation of the material the impeller is made of With this the properties of the material will be in contradiction with the required rigidity of the impeller experiencing a considerable action of centrifugal forces during operation. This contradiction results in it being impossible to manufacture a corrugated disk with the degree of the blade curvature being great enough. Therefore with such arrangement it will be impossible to eliminate the surplus pressure and to reduce the amount of power to be supplied.

The low heat exchange efficiency of the known device is explained by the following. The heat exchange efficiency is to a certain extent influenced by both the area of the heat exchange surface and the rate at which the heat carrier passes over it. With radial blades, firstly, the area of heat exchange will be at its minimum, since the radial blades are of minimum length, and, secondly, the rate at which the heat carrier passes over that area will decrease towards the periphery of the impeller, which is caused, taking into account the continuity of the air stream, by the fact that the cross-section area of the interblade space increases towards its periphery. Thus, notwithstanding that the area of heat exchange is comparatively large, its efficiency is not going to be high.

Another factor behind the low efficiency of heat exchange is the direct-flow process implemented in the device where both heat carriers flow unidirectionally: in the known device they flow from the center to the periphery of the impeller. Whilst it is known that a better heat exchange efficiency can be achieved if the counter-flow pattern is used where the heat carriers flow in opposite directions. In regard to the known device this means that one of the impeller sides should work as a centripetal one. However, it is not possible with radial blades, and manufacturing a corrugated disk with bent blades, as it was already mentioned, presents a fairly complicated engineering problem, and, bearing in mind that the shape of the blades on both sides will be different, it will be impossible to make the impeller as a corrugated disk.

SUMMARY OF THE INVENTION

The engineering problem at the solution whereof the claimed invention is aimed, is to increase the efficiency of heat exchange and to lower the power consumption. Three embodiments of the solution for the stated problem are claimed.

The essence of the claimed invention according to the first embodiment consists in that in a heat exchanger type fan comprising a casing and an impeller of a double-sided centrifugal fan mounted in it, the casing being divided into two isolated chambers which, together with the impeller, form two isolated centrifugal fans, in accordance with the invention the impeller is made as a solid dividing disk on both sides whereof blades are made normal to its plane, said blades being bent backwards (backward-curved).

Replacement of the corrugated impeller disk with a solid disk with the blades made normal to its surface on both its sides will allow for the manufacturing of the blades of any desired curvature, such arrangement being no longer dependent on the manufacturing technology for the corrugated surface. The fact that the blades are made bent backwards permits to make the surplus pressure at the outlet of the centrifugal fan considerably lower, thus reducing the amount of power consumed. Changing the curvature of the blades it becomes possible to change the cross-section area of the interblade space normal to the blades, to seek for the constant rate of the airflow passing over the blade surfaces. Manufacturing the blades this way, as distinct from the known one, will make it possible to considerably increase both the number of the blades and "the density of the impeller blade spacing", that is, the ratio of the blade length to the distance between the blades on the mid-radius, thus effectively raising the efficiency of heat exchange. Notwithstanding the fact that in the claimed fan design heat exchange between the two air streams takes place in addition through an introduced dividing disk, the possibilities for the modification of the blades of the impeller offered by the new design of the latter, to a large extent compensate the decrease in the heat exchange efficiency caused by the introduction of the additional dividing disk.

In order to noticeably increase the heat exchange efficiency in the claimed device, it makes sense to manufacture the blades with the ratio of their length that is determined by the bisecting line of blade profile to the distance between the blades over the mid-radius being no less than 10.

In order to increase the heat exchange area between the impeller blades additional intermediate blades can be installed over the periphery of the dividing disk In addition, the impeller blades may be made with a constant width of the interblade channel to provide for the uniform rate of the heat carrier flow in the interblade channel and, accordingly, to raise the efficiency of heat exchange.

Additionally, the fans may have a front disk attached to the blades, with an axial passage to let the heat carrier through into the interblade space. The front disk encloses the interblade space, thus reducing the fan losses and increasing the efficiency of heat exchange.

The blower outlets of both fans may be made axisymmetric and turned in the axial direction towards the side opposite to the respective suction inlet. Such arrangement will ensure that the heat carriers pass from the one to the opposite side of the device. This will considerably facilitate the installation of the claimed heat exchanger type fan in the systems of ventilation and air conditioning, corresponding to the direction of the input and the exhaust airflows.

The essence of the claimed invention according to the second embodiment consists in that in a heat exchanger type fan comprising a casing and a two-sided impeller mounted in it, on one side whereof the blades of a centrifugal fan are arranged, the casing being divided into two isolated chambers which, together with the impeller, form two isolated sections, one of which being a centrifugal fan, in accordance with the invention the impeller is made as a dividing disk, the above-mentioned blades of the centrifugal fan being arranged on one side of the dividing disk, while on its other side the blades of a centripetal fan are made, in the aggregate forming the above-mentioned two-sided impeller, one side whereof serving as the impeller of said centrifugal fan, and the other one—as that of the centripetal fan.

Replacement of the corrugated impeller disk with a solid disk with the blades made on both its sides will allow for the manufacturing of the blades of any desired shape, such arrangement being no longer dependent on the manufacturing technology for the corrugated surface. Specifically, on one side of the impeller centripetal blades are made, which provides for its operation as a centripetal fan. In this case the most efficient counter-flow heat exchange pattern is implemented. Changing the curvature of the blades it becomes possible to change the cross-section area of the interblade space normal to the blades, to seek for the constant rate of the airflow passing over the blade surfaces. Manufacturing the blades this way, as distinct from the known one, will make it possible to considerably increase both the number of the blades and "the density of the impeller blade spacing", that is, the ratio of the blade length to the distance between the blades on the mid-radius, thus effectively raising the efficiency of heat exchange. Notwithstanding the fact that in the claimed fan design heat exchange between the two heat carriers takes place in addition through an introduced dividing disk, the counterflow heat exchange pattern and the possibilities for modification of the blades of the impeller offered by the new design implementation of the latter, not only compensate for the decrease in the heat exchange efficiency associated with the introduction of the additional dividing disk, but enhance this parameter of the device on the whole.

To lower the surplus pressure at the outlet of the centrifugal fan and the inlet of the centripetal fan, the blades should be made bent backwards (backward-curved).

As with the first embodiment, in order to increase the heat exchange area it is expedient to manufacture the blades of the fans with the ratio of their length to the distance between the blades over the mid-radius being no less than 10.

As with the first embodiment, in order to increase the heat exchange area between the blades of the fans, intermediate blades may be installed over the periphery of the dividing disk As with the first embodiment, the impeller blades may be made with a constant width of the interblade channel to provide for the uniform rate of the heat carrier flow in the interblade channel and, accordingly, to raise the efficiency of heat exchange.

In addition, the impeller of the centrifugal fan may have a solid front disk (impeller shroud) attached to the blades, and the dividing disk may have an axial passage, around which the outlet of the centripetal fan can be made, connected to the interblade space of the centrifugal fan impeller. With this the above-mentioned outlet of the centripetal fan shall be located inside the suction inlet of the centrifugal fan. Such configuration will ensure that the heat carriers pass from the one to the opposite side of the device, thus facilitating its installation, for instance, in the systems of ventilation and air conditioning, corresponding to direction of the input (or the exhaust) airflow.

As with the first embodiment, the impeller of the centrifugal fan may have a front disk (impeller shroud) attached to the blades, with an axial passage to let the drawn-in heat carrier into the interblade space of the centrifugal fan. The front disk (impeller shroud) encloses the interblade space, thus reducing the fan losses and increasing the efficiency of heat exchange.

Besides, in order to reduce losses at the input, an inlet may be arranged around the axial passage of the impeller front disk (impeller shroud) of the centrifugal fan, said inlet being connected to the interblade space of the centrifugal fan impeller; at that this inlet should be installed inside the suction inlet of the centrifugal fan with a minimum gap allowed, said gap to be selected so that during rotation of the centrifugal fan the outside surface of the above-mentioned inlet would not come into contact with the suction inlet. Also, the impeller of the centripetal fan may have a solid front disk attached to the blades, and the dividing disk may have an axial passage, around which the outlet of the centripetal fan can be arranged, connected to the interblade space of the centripetal fan impeller, the above-mentioned outlet of the centripetal fan located inside the inlet of the centrifugal fan. As shown above, such configuration ensures that the heat carriers pass from the one to the opposite side of the device.

The essence of the claimed invention according to the third embodiment consists in that in a heat exchanger type fan comprising a casing and a two-sided impeller mounted in it, on one side whereof the blades of a centrifugal fan are arranged, the casing being divided into two isolated chambers which, together with the impeller, form two isolated sections, one of which being a centrifugal fan, in accordance with the invention the impeller is made as a dividing disk, the above-mentioned blades of the centrifugal fan being arranged on one side of the dividing disk, while on its other side turbine blades are arranged, in the aggregate forming the impeller, one side whereof serving as the impeller of the above-mentioned centrifugal fan, and the other one—as that of the centripetal turbine.

Like with the previous embodiments, replacement of the corrugated impeller disk with a solid disk with the blades on both its sides will allow for the manufacturing of blades of any desired shape, such arrangement being no longer dependent on the manufacturing technology for the corrugated surface. Centrifugal blades are arranged on one side of the impeller to provide for its operation as a centrifugal fan, and the blades of a centripetal turbine on the other side. In this case the most efficient counter-flow heat exchange pattern is implemented. Like with the previous embodiments, changing the curvature of the blades it becomes possible to change the cross-section area of the interblade space normal to the blades, seeking for the constant rate of the airflow passing over the blade surfaces, as well as to increase considerably both the number of the blades and "the density of the impeller blade spacing".

Besides, arranging turbine blades on one side of the impeller will make it possible to use the claimed device in the systems with an external blower, thus further reducing the power consumption due to the fact that the heat carrier entering via the inlet of the turbine under pressure, will rotate the impeller. At a certain pressure it might be sufficient to provide for the impeller rotation without using an additional drive.

To enhance the performance of the device, a blower may be additionally installed in the inlet of the turbine. At that in one of the particular cases of embodiment of the idea the inlet of the turbine is made as a ring-shaped orifice coaxial to the impeller, and the blower is made as an axial fan whose blades overlap the above-mentioned ring-shaped orifice of the turbine inlet. In another case the inlet of the turbine is made as an orifice in its peripheral part, and the blower is made as a centrifugal fan installed in this orifice.

As with the previous embodiments, to lower the surplus pressure at the outlet of the centrifugal fan and the inlet of the turbine, the respective blades should be made bent backwards (backward-curved).

As with the previous embodiments, in order to increase the heat exchange area, the blades of the centrifugal fan and/or blades of the centripetal turbine shall be manufactured with the ratio of their length to the distance between the blades over the mid-radius being no less than 10.

As with the previous embodiments, in order to increase the heat exchange area between the blades of the centrifugal fan and/or blades of the turbine, intermediate vanes may be installed over the periphery of the dividing disk As with the previous embodiments, the blades of the centrifugal fan and/or blades of the turbine may be made with a constant width of the interblade channel to provide for the uniform rate of the heat carrier flow in the interblade channel and to raise, accordingly, the efficiency of heat exchange.

As with the second embodiment, a configuration to ensure that the heat carriers pass from the one to the opposite side of the device is also possible. For that purpose the impeller of the turbine may have a solid front disk attached to the blades, and the dividing disk may have an axial passage, around which the outlet of the turbine can be arranged, connected to the interblade space of the turbine impeller. With this the above-mentioned outlet of the turbine shall be located inside the suction inlet of the centrifugal fan.

As with the previous embodiments, in order to reduce the fan losses and increase the efficiency of heat exchange, the impeller of the centrifugal fan may have a front disk (impeller shroud) attached to the blades, with an axial passage to let the drawn-in heat carrier into the interblade space of the centrifugal fan.

As with the second embodiment, in order to reduce losses at the input, an inlet can be arranged around the axial passage of the impeller front disk (impeller shroud) of the centrifugal fan, said inlet being connected to the interblade space of the centrifugal fan impeller, at that this inlet should be installed inside the suction inlet of the centrifugal fan with a minimum gap allowed. In this case the impeller of the turbine may also have a solid front disk (impeller shroud) attached to the blades, and the dividing disk may have an axial passage, around which the outlet of the turbine can be arranged, connected to the interblade space of the turbine impeller, the above-mentioned outlet of the turbine located inside the inlet of the centrifugal fan.

The presence of a centripetal turbine permits, in the latter configuration of the inlet and the outlet of the centrifugal fan, as well as of the inlet and the outlet of the turbine, to implement a two-stage heat exchange pattern. In this case the described device will serve as the first stage, complemented with the second identical stage, both stages being installed coaxially and with the front disks of the turbines towards each other, while the blower outlets of the centrifugal fans of one stage are connected to the inlets of the turbines of the other stage. With this, the suction inlet of the first stage and the outlet of the second stage will respectively serve as the inlet and the outlet for one heat carrier, while the suction inlet of the second stage and the outlet of the first stage will respectively serve as the inlet and the outlet for the other heat carrier. With this combination of two identical devices the centrifugal fan of one of those (of one stage) will deliver the stream of one of the heat carriers to the turbine of the other device. The transfer of the other heat carrier will proceed in the opposite direction. Heat exchange between the heat carriers will take place as stated above—according to the counter-flow pattern.

The latter particular design of the third embodiment of the invention applied herein enables one, on the one hand, to considerably enhance the heat exchange (this is so because heat carriers pass two heat-exchange stages) and, on the other hand, to optimize the size of two-stage device (this is so because in this case impellers could be installed on one shaft and no additional blowers are needed for the purpose of turbine rotation). Additional decrease in the device size and weight can be attained due to making front disks of the turbines of both stages as a single unit—that is in the form of one disk.

BRIEF DESCRIPTION OF THE DRAWINGS

The essence of the invention applied is illustrated by figures and diagrams that depict the following:

FIG. 5—heat exchanger type fan (according to the first design embodiment) with a different-direction, axisymmetric arrangement of blower outlets turned in the axial direction to the opposite side in relation to the corresponding suction inlets;

FIG. 6—the same as in FIG. 5 (side view by cross section 6);

FIG. 13—heat exchanger type fan (according to the second design embodiment) with suction inlets of both centrifugal and centripetal fans being located opposite the blower outlets of both centrifugal and centripetal fans;

FIG. 14—the same as in FIG. 13 (side view from the left by cross section 14);

FIG. 15—the same as in FIG. 13 (side view from the right by cross section 15);

FIG. 16—heat exchanger type fan (according to the third design embodiment) with an axial fan used as a blower and installed in the inlet of the turbine;

FIG. 17—the same as in FIG. 16 (side view from the right by cross section 17);

FIG. 18—the same as in FIG. 16 (side view from the right);

FIG. 22—double-stage heat exchanger type fan (according to the third design embodiment) with separate impellers;

FIG. 23—the same as in FIG. 22 (side view by cross section 23);

FIG. 24—the same as in FIG. 22 (side view by cross section 24);

FIG. 25—the same as in FIG. 22 (side view by cross section 25);

FIG. 26—double-stage heat exchanger type fan (according to the third design embodiment) with a combined solid disk for the turbines of both stages;

FIG. 27—the same as in FIG. 26 (side view by cross section 27);

FIG. 28—the same as in FIG. 26 (side view by cross section 28);

FIG. 29—the same as in FIG. 26 (side view by cross section 29).

DETAILED DESCRIPTION OF PREFERRED EMBODIMENTS

Figure 1:
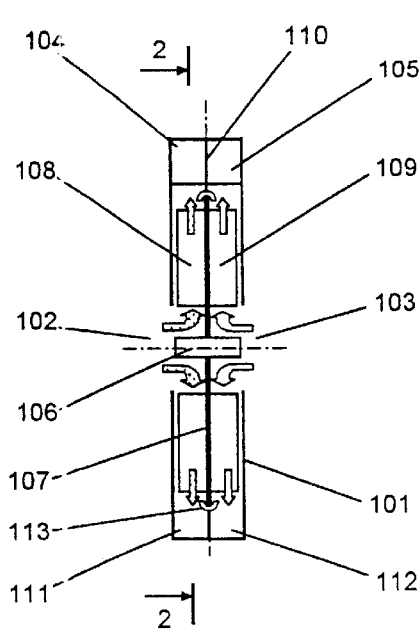
FIG. 1—heat exchanger type fan (according to the first design embodiment) with a unidirectional, symmetrical arrangement of blower outlets.

The first design embodiment of the heat exchanger type fan applied herein (FIGS. 1–6) consists of a casing 101 of spiral shape having axial inlets 102 and 103 on the opposite face and end sides and corresponding tangentially located blower outlets 104 and 105. An impeller consisting of a dividing disk 107 with blades 108 and 109 (normally fixed to both surfaces of said disk) that are bent backwards (backward-curved) in relation to rotation direction is installed on shaft 106 in casing 101. The inner space of casing 101 is separated by partition 110 into two internal spaces (chambers) 111 and 112 serving as the volutes for two centrifugal fans. The central part of partition 110 is adjacent to the outer edge of disk 107 (via a labyrinth seal 113 made, for example, out of rubber or felt). The arrows in FIG. 1 through FIG. 6 show the direction of airflows that serve as heat carriers.

Figure 2:
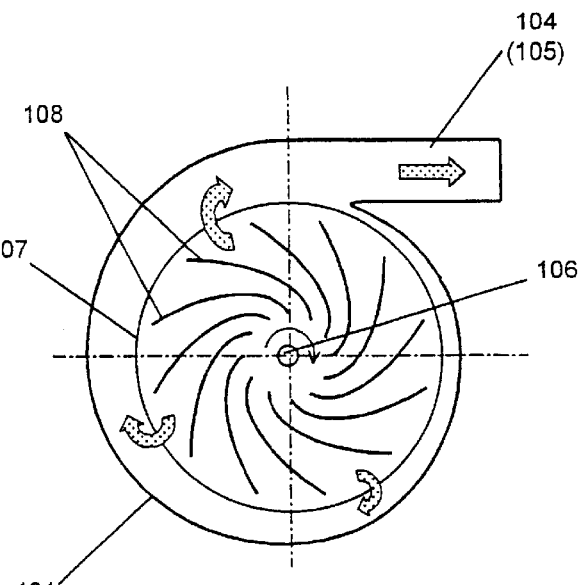
FIG. 2—the same as in FIG. 1 (side view by cross section 2)
Figure 3:
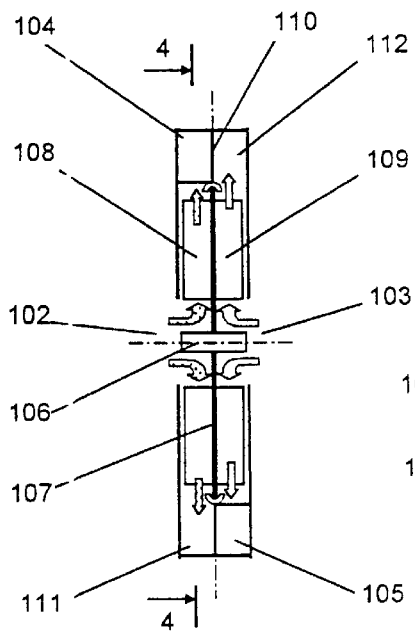
FIG. 3—heat exchanger type fan (according to the first design embodiment) with a different-direction, axisymmetric arrangement of blower outlets.
Figure 4:
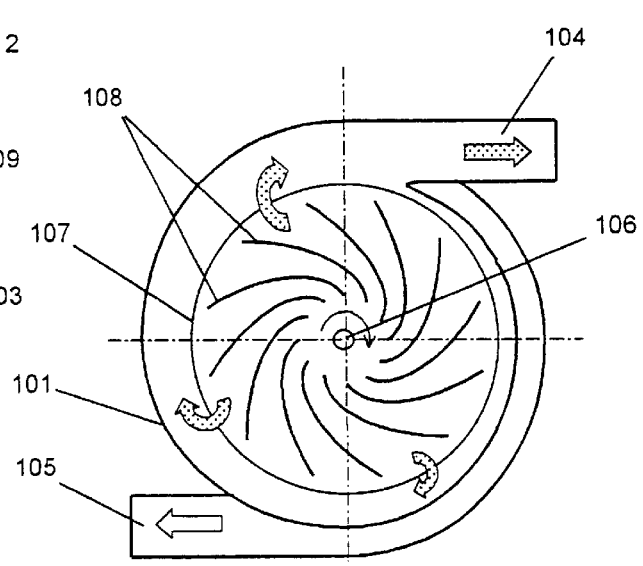
FIG. 4—the same as in FIG. 3 (side view by cross section 4)

FIGS. 1–2 present an example of an embodiment of a heat exchanger type fan with a unidirectional, symmetrical arrangement of blower outlets 104 and 105, while FIGS. 3–4 demonstrate an example of an embodiment of a heat exchanger type fan with a differently-directed axisymmetric arrangement of blower outlets 104 and 105.

The design presented in FIGS. 5–6 represents the preferred embodiment of a heat exchanger type fan. In this design an impeller has impeller shrouds 114 and 115 on its each side, and said impeller shrouds have axial passages intended for the flow of the drawn-in air into the interblade space. Impeller shrouds 114 and 115 have inlet shrouds 116 and 117, respectively, in the area of said axial passages. Inlet shrouds 116 and 117 are placed in the corresponding axial inlets 102 and 103 with a minimally admissible gap. Intermediate blades 118 are installed on the both sides of dividing disk 107—over its periphery (FIG. 6 shows said intermediate blades only on one side of disk 107). These intermediate blades increase the area of heat exchange. The arrangement of blower outlets 104 and 105 constitutes the distinguishing feature of this design. Said blower outlets are placed axi-symmetrically in such a manner that they are directed in different directions and turned in the axial direction to the opposite side in relation to the corresponding axial inlets 102 and 103.

Figure 7:
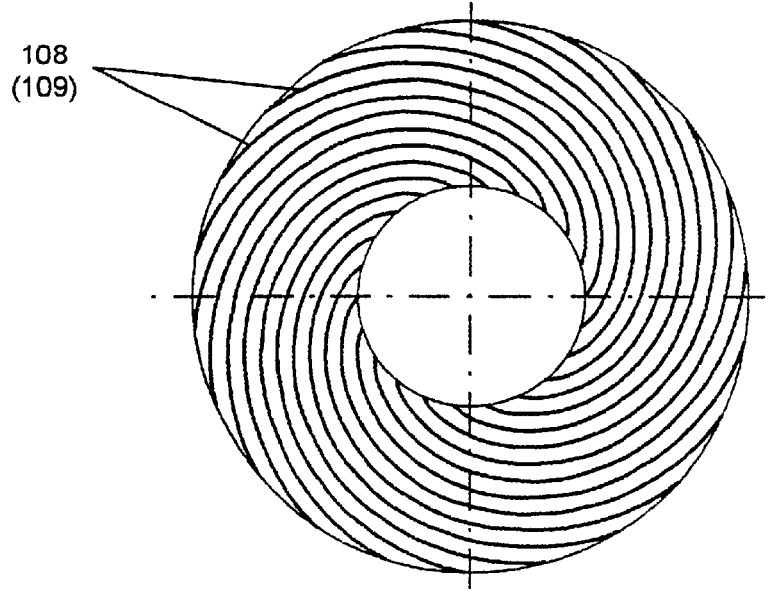
FIG. 7—an example of impeller blades with an interblade channel of constant width.
Figure 8:
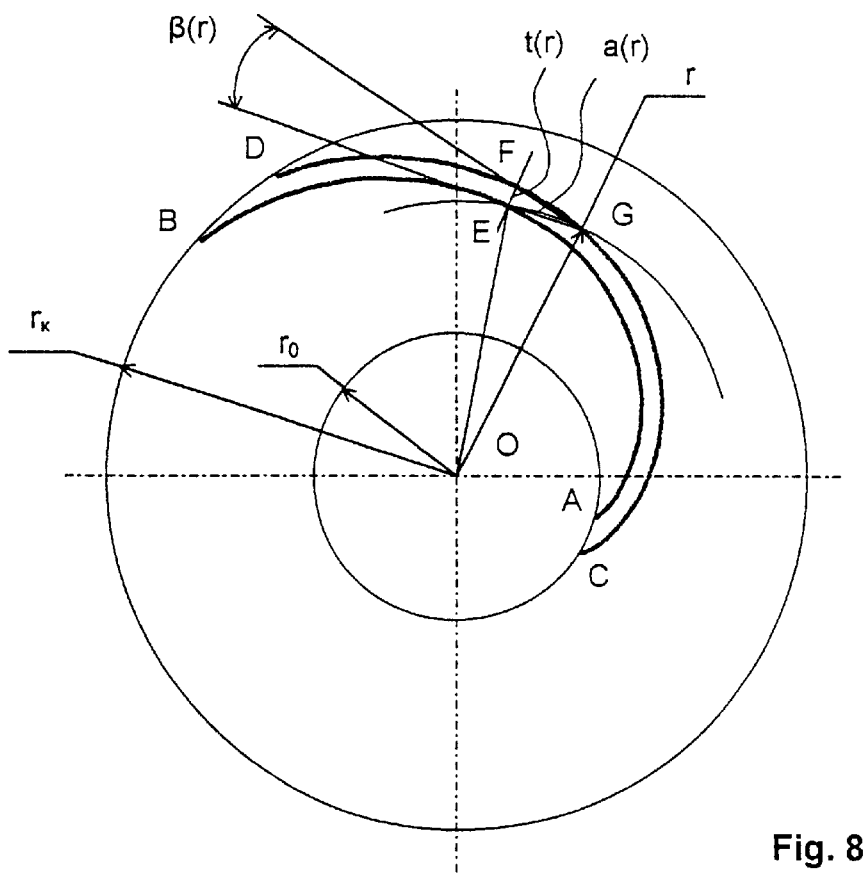
FIG. 8—an illustration of relationships for calculating blade profile for the case when an interblade channel is of constant width.

FIG. 7 presents an example of design of blades 108 (or 109) of the centrifugal fan with an interblade channel of constant width. FIG. 8 shows two adjacent blades (arc AB and arc CD) and corresponding geometric constructions for designing the said blade profile. For an arbitrary point E of arc AB located at a distance r from the center O of the impeller and for point F of arc CD corresponding to said point E (the distance between point E and point F—t(r) is the width of the interblade channel), we determine point G of arc CD that is also located at a distance r from the center O of the impeller. Distance a(r) between points E and G for a great number of blades Z is approximately equal to the length of arc EG—in other words, $a(r) \approx 2\pi r/Z$. Under these conditions the value of t(r) could be defined as $t(r) \approx a(r) \cdot \sin\beta(r)$. Using numerical methods it is possible to calculate the values of angle $\beta(r)$ for the case when t(r)=T (where T=const), thus determining the profile of a blade. In particular, FIG. 7 and FIG. 8 present an example for the case when the number of blades is 22 (Z=22) and when the relationship $r_0$ between the minimal distance from a blade to center O (point A) to the maximum distance (point B) is $r_0 = 0.4 r_K$. For this case we have determined the values of $\beta(r)$ that fall within $\beta(r_0) = 34.22°$ and $\beta(r_K) = 13.0°$. Milling of a disk (the initial thickness of which is determined by a required depth of the interblade channel) represents one of the ways for making blades of the indicated profile. In this case a milling cutter of diameter T should be used, while the calculated values $\beta(r)$ should be used by the program control unit of a milling machine.

The first embodiment of the device applied herein operates in the following manner. When shaft 106 rotates (together with the impeller fixed on it) the air streams (i.e. heat carriers) of different temperature pass from both sides through axial inlets 102 and 103 and then get into the space between blades 108 and 109, respectively. Under the action of centrifugal forces air streams flow by interblade space to the outer surface of the impeller and then get to the corresponding snail-like internal spaces (chambers) 111 and 112. Then they get expelled from casing 101 through blower outlets 104 and 105. As air streams pass through the impeller, a process of direct-flow heat exchange between them (through blades 108, 109 and dividing disk 107) takes place. Intermediate blades 118 also take part in the heat exchange process in the device design presented in FIG. 6.

The second embodiment of the heat exchanger type fan applied herein (see FIGS. 9–11, 13–15) comprises a casing 201 divided by partition 202 into two chambers—one of them serves as section 203 of the centrifugal fan, while another serves as section 204 of the centripetal fan. Casing 201 has suction inlet 205 and blower outlet 206 of the centrifugal fan plus suction inlet 207 and blower outlet 208 of the centripetal fan intended to let the pass-through of heat carriers of different temperature (the directions of air stream motion are shown by arrows). An impeller consisting of dividing disk 210 with centrifugal fan blades 211 and centripetal fan blades 212 that are normally fixed to the dividing disk 210 and that are bent backwards (backward-curved) in relation to the rotation direction is installed on shaft 209 in casing 201. In the peripheral part, centripetal fan blades 212 are turned transversely to the rotation direction thus forming blower blades 213 (see FIG. 12) that provide for the suction of heat carrier through inlet 207 of the centripetal fan. For the purpose of increasing the heat exchange area, both fans (i.e. centrifugal fan and centripetal fan) could be additionally equipped with intermediate blades installed in the peripheral part of dividing disk 210 between blades 211 and 212, respectively. Intermediate blades 214 of the centrifugal fan are shown as an example in FIG. 10. The central part of partition 202 is adjacent to the outer edge of dividing disk 210 (only labyrinth seal 215 made, for example, out of rubber of felt separates them), owing to which fact section 203 of the centrifugal fan and section 204 of the centripetal fan are sealed off from one another.

Figure 9:
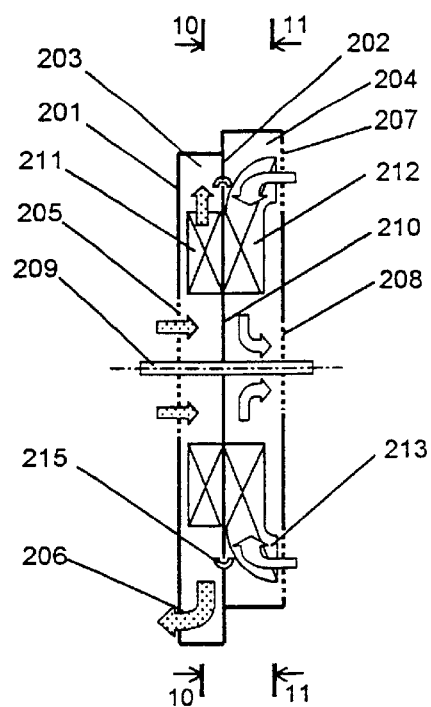
FIG. 9—heat exchanger type fan (according to the second design embodiment) with suction inlets and blower outlets of both centrifugal and centripetal fans being located on one side.
Figure 10:
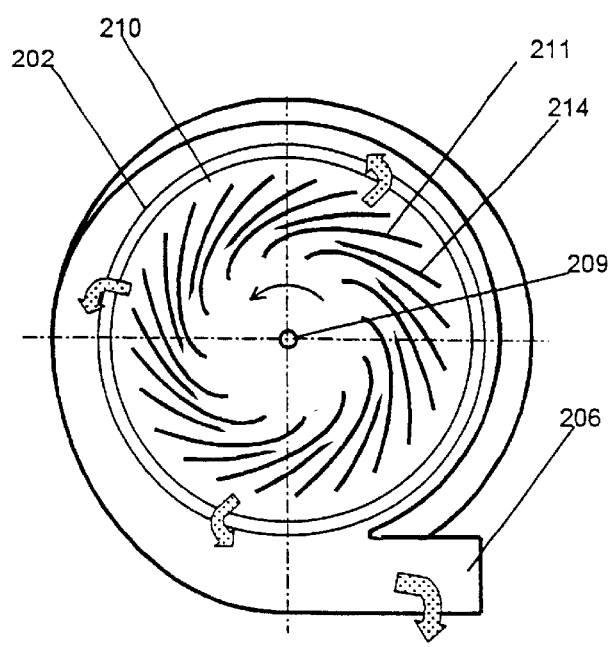
FIG. 10—the same as in FIG. 9 (side view from the left by cross section 10)
Figure 11:
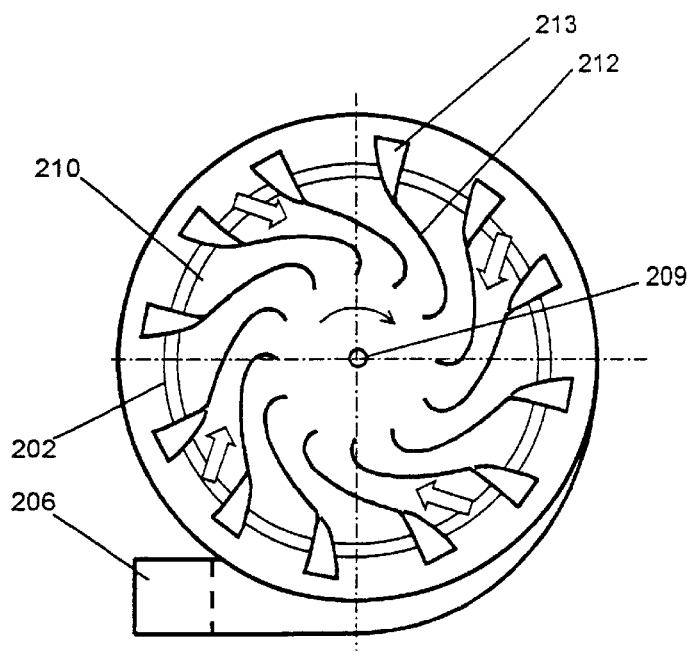
FIG. 11—the same as in FIG. 9 (side view from the right by cross section 11)
Figure 12:
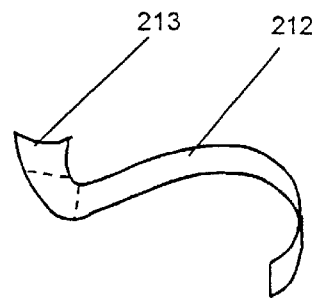
FIG. 12—blade of a centripetal fan.

FIGS. 9–11 present a design embodiment of a heat exchanger type fan with centrifugal fan inlet 205 and outlet 206 and centripetal fan inlet 207 and outlet 208 being located on one side, while FIGS. 13–15 present a design embodiment of a heat exchanger type fan with the above-indicated inlets/outlets being placed on different sides of the device. In the latter case blower outlet 206 of the centrifugal fan is turned in the axial direction so that it facing away from suction inlet 205. Besides, the device comprises (see FIG. 13) impeller shroud 216 fastened together with blades 211 of the centrifugal fan. Impeller shroud 216 has passage 217 intended to let the pass-through of heat carrier being drawn-in into the interblade space of the centrifugal fan. Inlet 218 (that is connected to the interblade space of the centrifugal fan and that is placed in suction inlet 205 with a minimal gap between them) is located around passage 217 of impeller shroud 216, Solid impeller shroud 219 is attached to blades 212 of the centrifugal fan, while dividing disk 210 has axial passage 220, around which outlet 221 of the centripetal fan is made in such a manner that it is connected to the interblade space of this fan. Besides, outlet 221 is placed inside centrifugal fan inlet 218. Owing to the above-indicated design features of the device presented in FIGS. 13–15, the outgoing flows of heat carriers are arranged on the different sides of the heat exchanger type fan in relation to the corresponding in-going flows.

Blades 211 of the centrifugal fan can be made in such a way that the width of the interblade channel is constant (as shown in FIG. 7).

The second embodiment of the device applied herein (see FIGS. 9–11) operates in the following manner. When shaft 209 rotates (together with the impeller fixed on it) the air streams (i.e. heat carriers) having different temperature pass from both sides through inlets 205 and 207 and then get into the space between blades 211 and 212, respectively. In the centrifugal fan, the air stream flows by interblade space to the periphery of the impeller, then gets into the spiral chamber of the centrifugal section 203, and then it gets expelled out of casing 201 through blower outlet 206. In the centripetal fan, another air stream flows by interblade space to the center of the impeller and then is removed from casing 201 through outlet 208. As air streams pass through the impeller, a process of counter-flow heat exchange between them (through blades 211, 212 and dividing disk 210) takes place. Intermediate blades 214 also take part in the heat exchange process in the device design presented in FIGS. 9–11.

The heat exchange process in the device presented in FIGS. 13–15 proceeds in the same manner. This device design differs from that presented in FIGS. 9–11 only by the flow of air streams downstream of the impeller. The air stream from the centrifugal fan passes through blower outlet 206 turned in the axial direction to the opposite side (in relation to suction inlet 205), while the air stream from the centripetal fan passes through axial passage 220 of dividing disk 210 and then gets into centripetal fan outlet 221 oriented in the axial direction to the opposite side in relation to inlet 207 of this fan.

The third embodiment of the single-stage heat exchanger type fan applied herein (see FIGS. 16–18) comprises a casing 301 separated by partition 302 into two chambers—one of them serves as section 303 of the centrifugal fan, while another serves as section 322 of the turbine. Casing 301 has suction inlet 305 and outlet shroud 306 of the centrifugal fan plus inlet 323 and outlet 324 of the turbine intended to let the pass-through of heat carriers of different temperature (the directions of air stream motion are shown by arrows). Turbine's inlet 323 is made in the form of an annular opening in casing 301. Besides, an impeller consisting of dividing disk 310 with centrifugal fan blades 311 and turbine blades 325 that are normally fixed to the dividing disk 310 and that are bent backwards (backward-curved) in relation to the rotation direction is installed in casing 301. The central part of partition 302 is adjacent to the outer edge of dividing disk 310 (only labyrinth seal 315 made, for example, out of rubber of felt separates them), owing to which fact section 303 of the centrifugal fan and section 322 of the turbine are sealed off from one another. In addition, the device comprises impeller shroud 316 fastened together with blades 311 of the centrifugal fan. Impeller shroud 316 has passage 317 intended to let the pass-through of heat carrier being drawn-in into the interblade space of the centrifugal fan. Inlet 318 (that is connected to the interblade space of the centrifugal fan and that is placed in centrifugal fan suction inlet 205 with a minimal gap) is located around passage 317 of impeller shroud 316. Solid impeller shroud 326 is attached to turbine blades 325, while dividing disk 310 has axial passage 320, around which the above-mentioned outlet 324 of the turbine is made in such a manner that it is connected to the interblade space of this turbine. Besides, outlet 324 is placed inside inlet 318 of the centrifugal fan. In this instance the impeller is installed on shaft 309 in casing 301 through the use of turbine's impeller shroud 326.

The device also comprises a blower (an axial fan 327 serves as such), the blades 328 of which are located so that they are facing the annular opening of turbine inlet 323. Axial fan 327 can be installed on shaft 309 (as shown in FIG. 17) or it can be installed on a separate rotation shaft (that is not connected with shaft 309 and that is driven by a separate drive). In the latter case the drive of axial fan 327 may also serve as the drive for the entire device—this is so because the turbine will provide for the rotation of impeller and, hence, the operation of centrifugal section 303.

Figure 19:
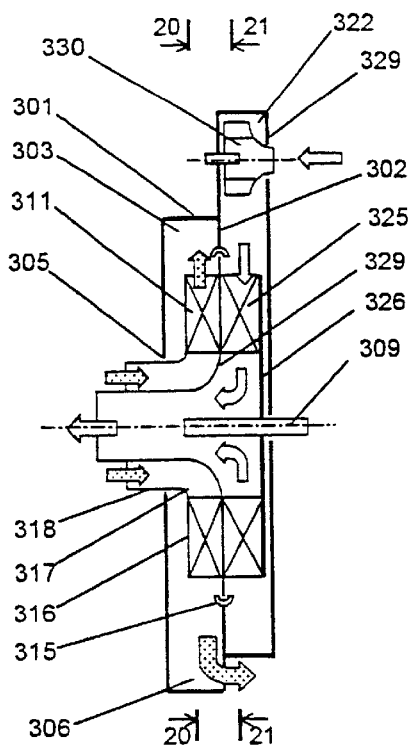
FIG. 19—heat exchanger type fan (according to the third design embodiment) with a centrifugal fan used as a blower and installed in the inlet of the turbine.
Figure 20:
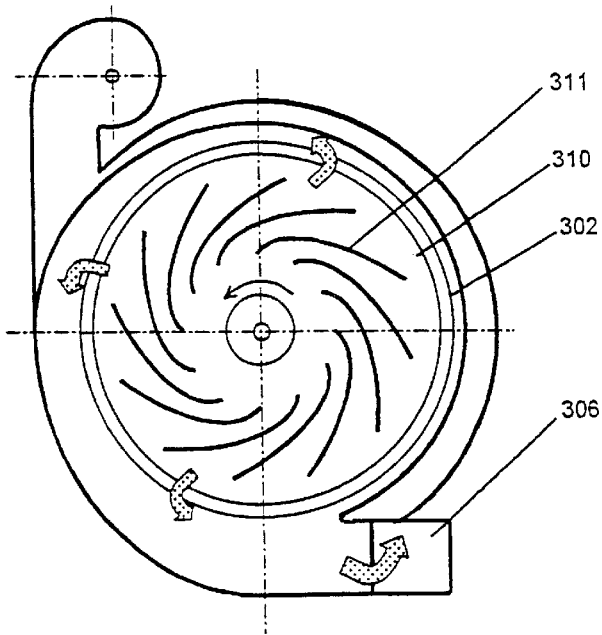
FIG. 20—the same as in FIG. 19 (side view from the left by cross section 20)
Figure 21:
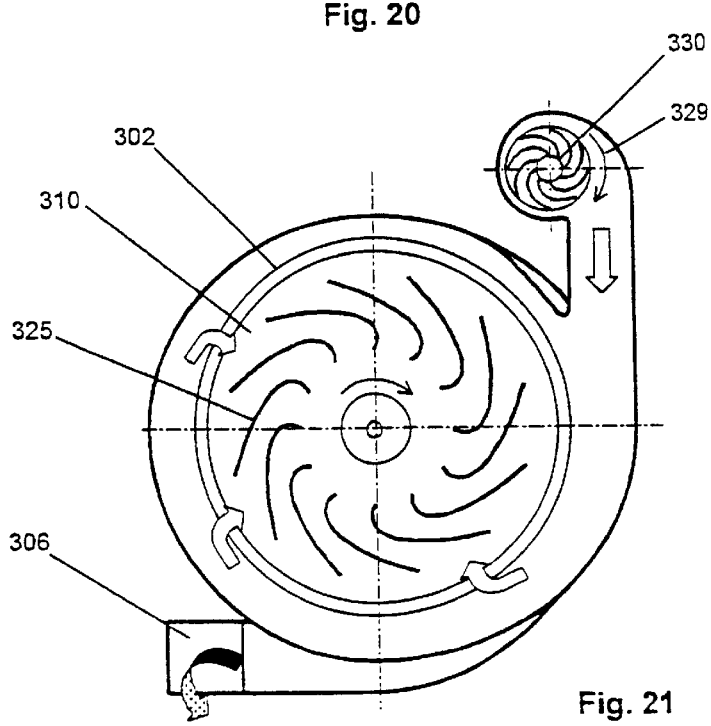
FIG. 21—the same as in FIG. 19 (side view from the right by cross section 21)

Another example of the third embodiment of the invention applied herein is presented in FIGS. 19–21. As distinct from the previous device embodiment, turbine inlet 329 in this design is made in the form of an opening in its peripheral part, while centrifugal fan 330 installed just opposite this opening serves as the blower.

The third embodiment of the device applied herein (see FIGS. 16–18 and 19–21) operates in the following manner. The impeller is set in motion by a drive connected to shaft 309 plus due to one of the air streams (heat carriers) forced into turbine section 322 by axial fan 327 (FIGS. 16–18) or centrifugal fan 330 (FIGS. 19–21). Given sufficient pressure, the impeller can rotate only due to stream forced into turbine section 322. Air streams having different temperature are fed from both sides through inlets 305 and 323, and then they get into the space between blades 311 and 325, respectively. In the centrifugal fan, the air stream flows by interblade space to the periphery of the impeller, then gets into the spiral chamber of the centrifugal section 303, and then it gets expelled out of casing 301 through outlet shroud 306. In the turbine, another air stream flows by interblade space to the center of the impeller, then through axial passage 320 of dividing disk 310 it gets to outlet 321, via which it is removed from casing 301. As air streams pass through the impeller, a process of counter-flow heat exchange between them (through blades 311, 325 and dividing disk 310) takes place.

The third embodiment of a double-stage heat exchanger type fan applied herein (see FIGS. 22–25 and 26–29) consists of two identical stages—the first stage 331 and second stage 332, each of which comprises section 333 and section 334 of the centrifugal fan plus section 335 and section 336 of the turbine, respectively. Both stages (i.e. stage 331 and stage 332) are made in the same manner as a single-stage heat exchanger type fan presented in FIGS. 16–18 and FIGS. 19–21. Stages 331 and 332 are oriented towards one another and installed on one and the same shaft 309 that is set in rotation by an external drive (this drive is not shown in FIGS. 22–25 and FIGS. 26–29). Partition 337 separates stage 331 from stage 332.

Blower outlet 338 of section 333 of the centrifugal fan of the first stage 331 is connected to inlet 339 of turbine section 336 of the second stage 332, while blower outlet 340 of section 334 of the centrifugal fan of the second stage 332 is connected to inlet 341 of turbine section 335 of the first stage 331. Suction inlet 342 of the first stage 331 and outlet 343 of the second stage 332 serve as an inlet and outlet, respectively, for one heat carrier, while suction inlet 344 of the second stage 332 and outlet 345 of the first stage 331 respectively serve as an inlet and outlet for another heat carrier.

A double-stage heat exchanger type fan design presented in FIGS. 26–29 represents the preferred third embodiment of the present invention. Unlike the example presented in FIGS. 22–25, the impeller shrouds of turbine sections 335 and 336 of both stages (i.e. stage 331 and stage 332) in this design are made in the form of a combined solid disk 346.

The third embodiment of a double-stage heat exchanger type fan (see FIGS. 22–25 and 26–29) operates in the following manner. When shaft 309 rotates (together with the impellers of stages 331 and 332) the air streams (i.e. heat carriers) are drawn-in through suction inlets 342 and 344 by centrifugal fans of sections 333 and 334, respectively. From the outlets of centrifugal fans of sections 333 and 336 the air streams get into turbine sections 334 and 335, respectively. Then they are forced out from the device through the respective outlets 343 and 345. Thus, each air stream passes through both stages—stage 331 and stage 332. As air streams pass through the impellers, an above-described process of counter-flow heat exchange between them (through blades of centrifugal fans, turbine blades, and dividing disks) takes place. Additional heat exchange takes place via the common combined solid disk 346 in the device presented in FIGS. 26–29.

What is claimed is:

1. A heat exchanger type fan comprising:

a casing having two inlets and two outlets, and a double-sided centrifugal impeller;

wherein the casing is divided into two isolated chambers, and the chambers together with the impeller form two isolated centrifugal fans;

wherein the impeller comprises a solid dividing disk, backward curved blades located on both sides of the dividing disk, and intermediate blades placed between said backward curved blades and located over a periphery of the dividing disk; and wherein a spacing between the walls of adjacent backward curved blades on at least one side of the dividing disk is made constant to provide a uniform channel width between the backward curved blades.

2. The heat exchanger type fan according to claim 1, wherein a ratio of a length of the blades to the spacing between the blades over a mid-radius of the impeller is at least 10.

3. The heat exchanger type fan according to claim 1, wherein an impeller shroud is attached to the blades on at least one side of the dividing disk, and the impeller shroud has an axial passage for enabling pass-through of heat carriers between the adjacent blades.

4. The heat exchanger type fan according to claim 1, wherein the two outlets are directed in different directions on opposite sides of the dividing disk and respectively face away from corresponding ones of the two inlets.

* * * * *